Jan. 30, 1962  J. W. SAILLER  3,018,767
ENGINE INTAKE MANIFOLD
Filed May 26, 1959  2 Sheets-Sheet 1
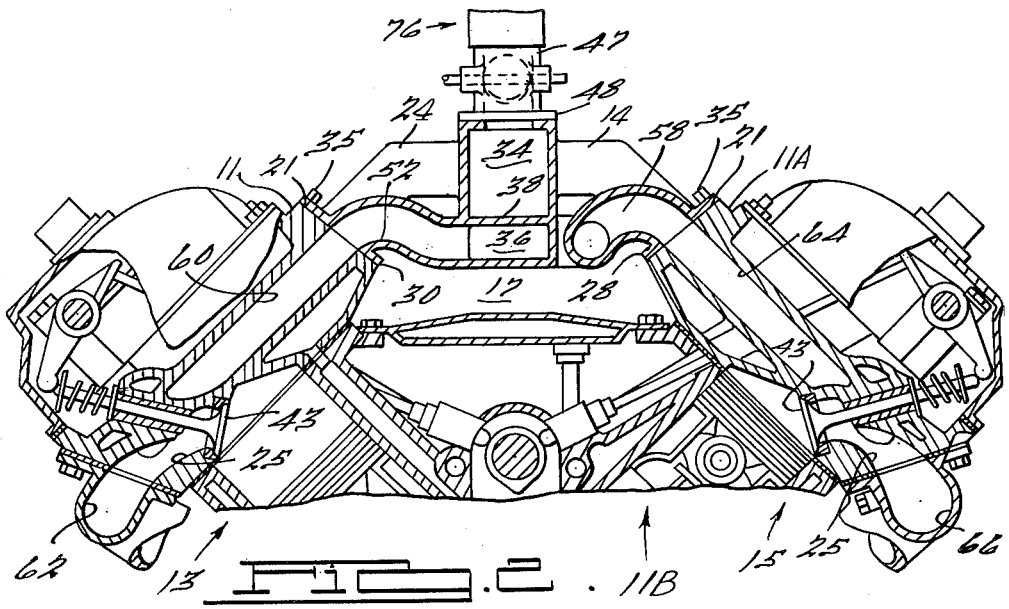
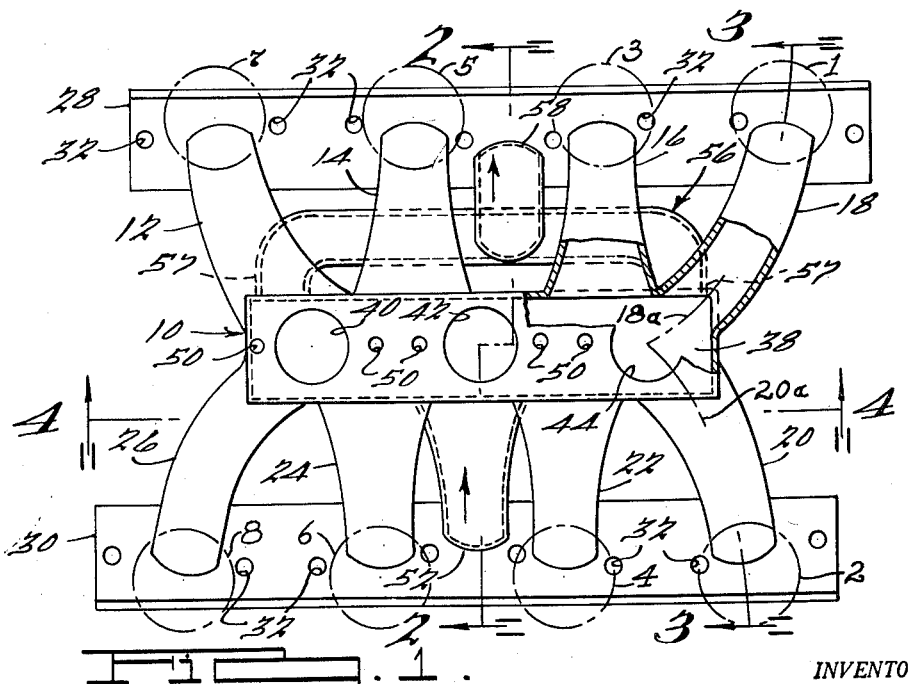
INVENTOR.
JOHN W. SAILLER
BY
Harness and Harris
ATTORNEYS.

Jan. 30, 1962    J. W. SAILLER    3,018,767
ENGINE INTAKE MANIFOLD
Filed May 26, 1959    2 Sheets-Sheet 2

INVENTOR.
JOHN W. SAILLER
BY
Harness and Harris
ATTORNEYS.

3,018,767
Patented Jan. 30, 1962

3,018,767
ENGINE INTAKE MANIFOLD
John W. Sailler, Royal Oak, Mich., assignor to Chrysler Corporation, Highland Park, Mich., a corporation of Delaware
Filed May 26, 1959, Ser. No. 815,868
3 Claims. (Cl. 123—122)

This invention relates to an intake manifold structure for internal combustion engines and particularly concerns manifold structures for engines which are supplied with a combustible mixture from a plurality of fuel feeding elements.

For the purpose of illustration, the invention is shown embodied in an intake manifold provided with three carburetors for supplying fuel to a V-8 engine. The manifold comprises an elongated single level plenum chamber or primary distribution passage extending longitudinally of the engine and having individual branch passages connecting this chamber with the intake passages of the individual cylinders of the engine. The carburetors are spaced longitudinally of the chamber and seat upon suitable vertical risers opening into the chamber, the end risers being located substantially at the intersection of opposite end branch passages and the remaining one being centrally located, these locations assuring a substantially uniform distribution of the gaseous mixture to the chamber and to the individual cylinders.

The intake manifold is moreover provided with a novel arrangement for preheating the combustion charge fed to the plenum chamber and which assures adequate heating of the gaseous charge being fed to the cylinders regardless of the number of carburetors feeding the chamber. Thus a feature of the invention is the provision of a heating zone or chamber underlying the entire length of the intake manifold plenum chamber provided with a central side intake and end side discharge outlets to assure a uniform distribution of heat over the length of the plenum chamber to the floor of such chamber which heat is then distributed upwardly by radiation to uniformly heat the incoming charge from the carburetors seated on the chamber.

It is an object of this invention to provide an intake manifold with a single level plenum chamber for feeding all of the cylinders of the engine and which itself is fed by a plurality of fuel supplying elements suitably arranged to provide uniform distribution of the gaseous charge.

Another object is to provide means for preheating the gaseous charge received by a plenum chamber of the character in the preceding object before such charge is distributed to the individual cylinders.

A specific object is to provide an intake manifold with a plurality of carburetors and also with heating duct means for uniformly heating the risers of each of the manifold fuel inlet passages.

Another specific object of this invention is to provide a heating chamber for the distribution passage of an intake manifold, which heating chamber contains sufficient baffle means to insure uniform heating interiorly of the distribution passage along its entire length and breadth.

A further object of this invention is to provide a heating means for an intake manifold having multiple carburetors, which manifold can be used on in-line engines or V-type engines, and which heating means will insure the proper uniform preheating of the combustion charge necessary for the most efficient engine performance.

Further objects and advantages will become apparent from the following description and drawings, in which:

FIGURE 1 represents a top elevational view of the intake manifold of the present invention with the right-hand end thereof corresponding to the front of the engine;

FIGURE 2 represents a transverse cross sectional view of the manifold of FIGURE 1 mounted on a V-engine taken along the line corresponding to 2—2 of FIGURE 1 in the direction of the arrows;

Figure 3:
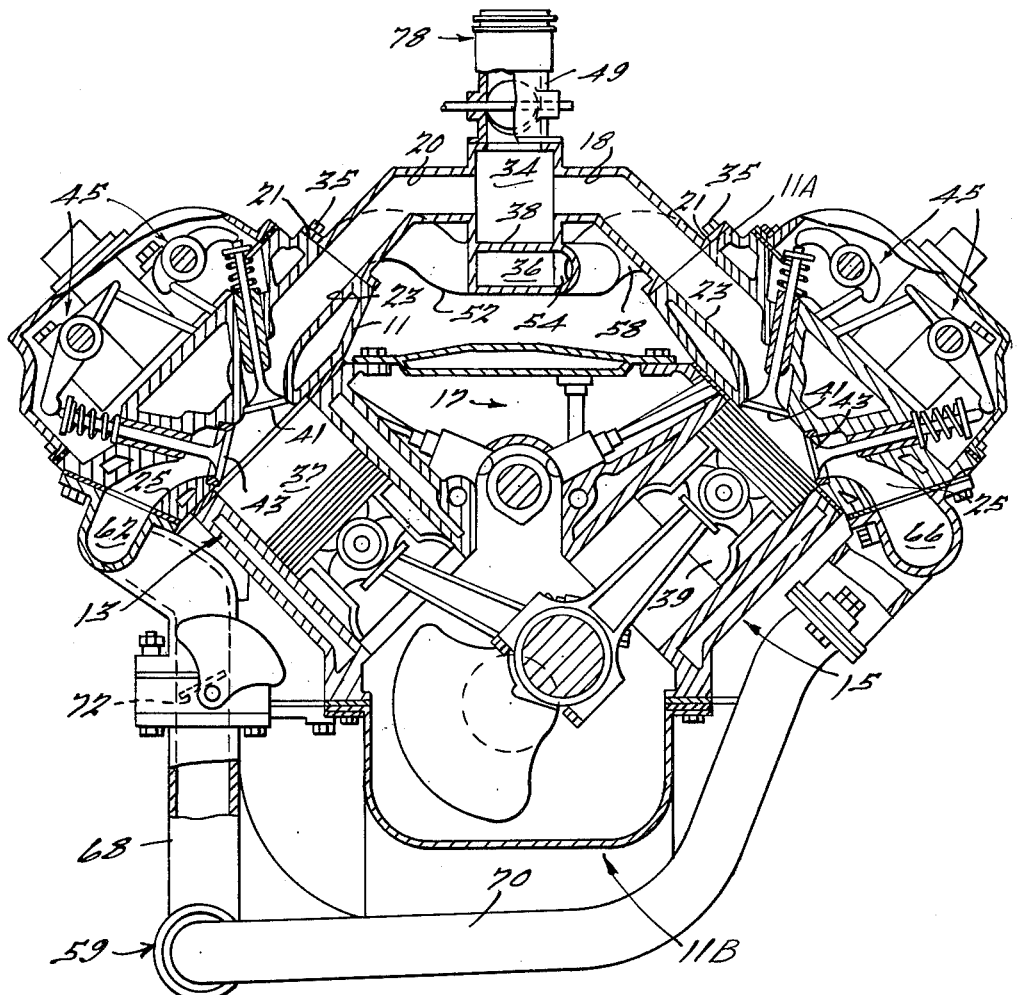
Figure 4:
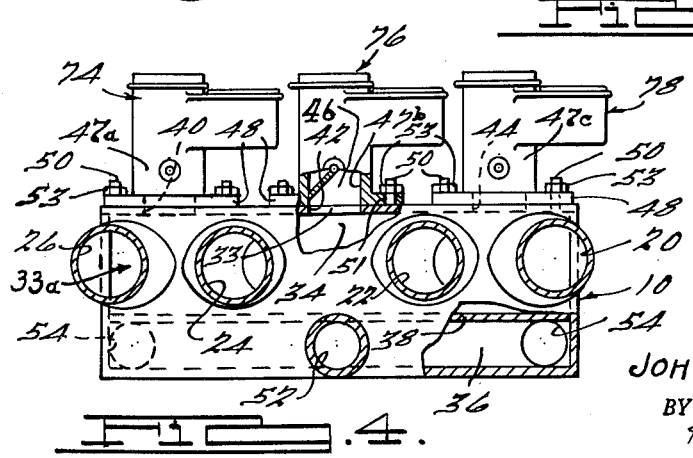

FIGURE 3 represents a transverse cross sectional view of the intake manifold structure of FIGURE 1 mounted on a V-engine taken along the line corresponding to 3—3 of FIGURE 1 in the direction of the arrows; and FIGURE 4 represents a longitudinal partial sectional view of the distribution passage means and heating chamber means of the intake manifold of FIGURE 1 taken along the line 4—4 thereof in the direction of the arrows.

Referring to the drawings and in particular to FIGURES 1, 2, and 3 an intake manifold 10 is shown extending longitudinally of the engine intermediate the heads 11, 11A and is provided with a plurality of branch conduits or passages 12, 14, 16, 18, 20, 22, 24, and 26 which conduits selectively extend to the opposite manifold mounting walls 28 and 30 where they terminate in openings connecting with the intake passages 23 of the heads to supply combustion charge to the engine cylinders 7, 5, 3, 1, 2, 4, 6, and 8 respectively. These mounting walls are provided with suitable bolt holes 32 adapted to receive bolts 35 for mounting the manifold 10 to the intake manifold branch passage mounting walls 21 of heads 11 and 11A of the V-engine 11B. Engine 11B is a typical V8 engine having opposing banks of cylinders 13 and 15 with pistons 37 and 39 respectively therein, and forming a central cavity 17 running longitudinally of the engine. Heads 11 and 11A are secured on cylinder banks 13 and 15 respectively and are provided with intake ports 23, exhaust ports 25, intake valves 41, exhaust valves 43, and double rocker arm systems 45 for actuating these intake and exhaust valves.

Referring to FIGURE 4 it is seen that the manifold 10 is comprised of a longitudinal distribution chamber or passage means 33a comprising a distribution passage 34 and a heating means or chamber 36 completely separated from each other by a wall 38 which extends the full length of the manifold 10. The distribution passage 34 receives at either side thereof the intake passages 12, 14, 16, 18, 20, 22, 24, and 26 as stated above. It is noted that the junction or intersection of the transverse passages 18 and 20 occurs at the center axis 18a and 20a, respectively thereof, and this junction is located along the center axis of the passage means 33a. The same is true for the transverse passages 12 and 26 located at the opposite end of passage means 33a. Located in the top wall of passage means 33a are three charge supplying vertical riser passages 40, 42, and 44 through which fuel from the overlying vertical charge supplying passages 46 of the respective risers 47a, 47b, and 47c of carburetors 74, 76, and 78 respectively is passed into the distribution passage 34. It is noted that the throttles of these carburetors are connected in series and are operated simultaneously by the throttle linkage. The carburetor risers as shown in FIGURE 4 are provided with flanges 48 which fit on the top wall 33 of chamber or passage 34. These flanges are secured to wall 33 by studs 50 mounted in wall 33 and received through suitable apertures 51 in the carburetor mounting flanges 48, and by nuts 53 threadably received on these studs 50. It is particularly noted that one or more of the carburetors could easily be disconnected from their charge supplying passages 40, 42, or 44 leading to the passage 34 should the use of all three carburetors not be desired for a particular engine. It is preferable in any case to employ the carburetor 76 over the passage 42 which passage is centrally located with respect to passage means 33a.

Heating chamber 36 of the manifold 10 is provided at one side with an exhaust gas heat inlet conduit or port 52 which enters chamber 36 directly underneath the centrally located passage 42 leading into passage 34. The opposite side of chamber 36 is provided at each end thereof with exhaust gas outlets 54 opening into ends 57 of heating chamber outlet manifold section 56 (FIGURE 1) which is formed into a U-shape and having its ends integral with or secured to the opposite ends of chamber 36. Manifold section 56 is provided adjacent its center portion with an outlet 58 which extends through the wall of the mounting plate 28 and is adapted to be connected to the exhaust passages 64 in head 11A. It is noted that hot exhaust gas entering intake 52 flows into the heating chamber 36 directly underneath the central or primary carburetor riser 47b and passage 42 communicating with passage 34 and then separates to either end of chamber 36 and is emitted through the outlets 54 at each end of chamber 36 and into manifold section 56 from which it flows out of outlet 58 to eventually blend into the exhaust stream and be emitted into the common exhaust system 59 of the engine. This construction causes the hot exhaust gas entering through intake 52 to become baffled and distributed evenly throughout the entire length of chamber 36 and along wall 38. The heat from wall 38 is radiated into passage 34 to uniformly heat the risers 46, 47, and 49 and any fuel charge therein and in the distribution passage itself. This uniformity in heating of the combustion charge is very important in insuring proper engine efficiency according to the most theoretical calculations since it eliminates the preferential over-enrichment and under-enrichment of the cylinders normally caused by non-uniform combustion mixture volume conditions in the intake manifold.

To provide a path for the exhaust gas from head 11 through the chamber 36 and into head 11A, a crossover feed passage 60 is provided in head 11 and communicates with the exhaust manifold 62 thereon to receive hot exhaust gas therefrom. Passage 60 is also connected to port 52 which feeds the hot exhaust gas into chamber 36. Located in head 11A is an exhaust passage 64 connected into exhaust manifold 66 on head 11A and to outlet 58 of manifold section 56 which connects to each end of chamber 36 at 54 to provide an outlet to the main exhaust system for the exhaust gas conveyed into chamber 36. Exhaust manifolds 62 and 66 may both be connected to a common or main exhaust passage 59 through pipes 68 and 70 respectively. Located in the joint between manifold 62 and pipe 68 is a conventional thermostatically actuated manifold heat control valve 72 such as that used on present automobiles and which is biased closed by a bimetal coil spring when the engine is cold so as to force the exhaust gas of the cylinders in bank 13 through the passage 60 and into chamber 36. When the engine is hot and heating of the charge in chamber 34 is not required, valve 72 is opened by a relaxing of the bimetal coil spring to allow the exhaust gas of cylinder bank 13 to escape through pipe 68 directly into the main exhaust passage 59.

I claim:

1. In an internal combustion engine having a bank of cylinders arranged in a row longitudinally thereof, intake manifold means for feeding a combustible charge to said cylinders comprising a single level elongated primary distribution passage means extending longitudinally of the engine adjacent said bank, individual branch passage means extending transversely from said primary distribution passage means for connecting this primary passage means with the cylinders of said bank, riser means connecting with said primary passage means for delivering said charge to said primary passage means, a heating chamber underlying said primary passage means and extending substantially lengthwise contiguously therewith, said primary passage means and chamber having a common wall means, a single central inlet in said heating chamber for receiving a heating medium and a pair of outlets one adjacent each end of said heating chamber from which to discharge said heating medium.

2. In an internal combustion engine having a bank of cylinders arranged in a row longitudinally thereof each including an intake passage for each cylinder; intake manifold means for feeding a combustible charge to said intake passages of said cylinders comprising a single level elongated primary distribution passage means of generally rectangular section extending longitudinally of said engine adjacent said bank of cylinders, said primary passage means having a top wall, a bottom wall and opposite side walls, individual branch passage means spaced apart longitudinally of said primary passage means and extending transversely thereof, said branch passage means having inlets in a side wall of said primary passage means and outlets connecting with the said intake passages of said cylinders, a plurality of riser means opening into said primary passage means through the top wall thereof for delivering a combustible charge to said primary passage means, a heating chamber of generally rectangular section underlying said primary passage means and extending longitudinally of said engine substantially contiguously with said primary passage means, said heating chamber having as its top wall the bottom wall of said primary passage means, a single inlet port opening into said heating chamber generally centrally longitudinally thereof through which to deliver a heating medium to said heating chamber and a pair of discharge ports opening into said heating chamber through which to discharge said heating medium, said discharge ports being located adjacent the opposite longitudinal ends of said heating chamber.

3. An intake manifold for a multi-cylinder engine having opposite cylinder heads each of which is provided with a mounting face for said manifold, a passage for conducting a fluid heating medium to said manifold and charge delivery passages between said mounting face and the intake valve ports of the cylinders; said manifold comprising opposite mounting flange portions for mounting said manifold to said mounting faces of said cylinder heads, a single level generally central longitudinally extending elongated charge distribution chamber means, said distribution chamber means having top and bottom walls and opposite side walls, individual branch conduit means on opposite sides of said distribution chamber means extending transversely thereof from openings in said side walls thereof to terminal openings in said mounting flange portions, each of said branch conduit means connecting through its terminal opening with a different charge delivery passage of said heads, half the number of said branch conduit means connecting with one of said side walls of said distribution chamber means and the other half thereof connecting with the opposite side wall of said distribution chamber means, charge delivery riser means in said top wall of said distribution chamber means for delivering a combustible charge thereto, heating chamber means underlying said distribution chamber means and extending substantially contiguously therewith, said chamber means having as its top wall said bottom wall of said distribution chamber means, a first conduit means connecting the central longitudinal portion of said heat chamber means at one side thereof with the mounting flange portion of said manifold nearest thereto, a second generally U-shaped conduit means having its opposite leg portions connecting with the opposite side of said heat chamber means adjacent the longitudinal end portions thereof and a third conduit means connecting the base portion of said U-shaped conduit means with the mounting flange portion of said manifold opposite that with which said first conduit means connects, and each of said first and third conduit means terminating in openings in said flange portions adapted to connect with said fluid heating medium passages of said heads.

References Cited in the file of this patent

UNITED STATES PATENTS

| | | |
|---|---|---|
| 1,990,662 | Moore | Feb. 12, 1935 |
| 2,001,669 | Smith | May 14, 1935 |
| 2,098,424 | Kolimbat | Nov. 9, 1937 |
| 2,603,199 | Moseley | July 15, 1952 |
| 2,864,349 | Bandli et al. | Dec. 16, 1958 |
| 2,886,022 | Fisher et al. | May 12, 1959 |